UNITED STATES PATENT OFFICE.

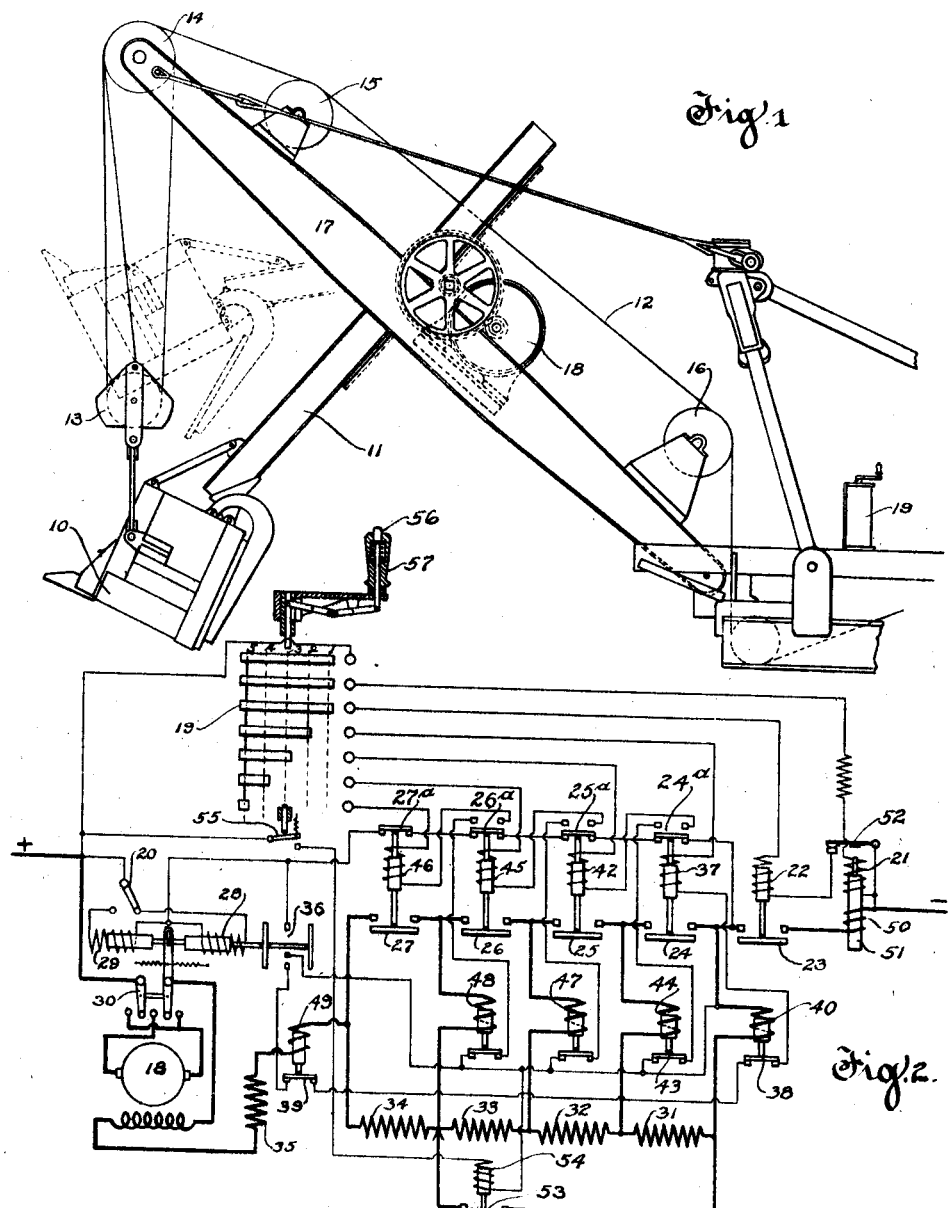

RAY C. NEWHOUSE, OF CINCINNATI, OHIO, ASSIGNOR, BY MESNE ASSIGNMENTS, TO ALLIS-CHALMERS MANUFACTURING COMPANY, A CORPORATION OF DELAWARE.

MOTOR-CONTROL SYSTEM.

1,087,972.  Specification of Letters Patent.  Patented Feb. 24, 1914.

Application filed April 22, 1910. Serial No. 557,005.

*To all whom it may concern:*

Be it known that I, RAY C. NEWHOUSE, a citizen of the United States, residing at Cincinnati, in the county of Hamilton and State of Ohio, have invented certain new and useful Improvements in Motor-Control Systems, of which the following is a full, clear, and exact specification.

My invention relates to motor control systems, and is particularly applicable in connection with the control of thrust motors of electrically operated shovels.

In the operation of power driven shovels it is sometimes necessary to give the dipper a shaking motion. This shaking motion may be desirable, or even necessary, either when the dipper is picking up stones or other lumpy material or when clay or other sticky material is being emptied from the dipper. Such a shaking movement can be obtained in steam driven shovels, but heretofore could not be obtained in electrically driven shovels.

It is the main object of my invention to obtain this shaking motion in the latter class of shovels.

It is my further object to allow the safe operation of the thrust motor to maintain a thrust without producing movement.

In attaining the first of these objects there is provided a control system which furnishes a number of control steps for the motor, and this system is provided with means whereby, if desired, with the controller in a less advanced position an effect may be produced the equivalent of that normally produced when the controller is in a more advanced position. By this arrangement the thrust motor may be given a series of jerks, as by repeated movements of the controller between the off and the first positions. In the preferred form of my invention the control system is of the remotely controlled automatically accelerated type.

The second object of my invention is attained by providing a suitable resistance permanently in series with the motor, thereby preventing the motor from being connected directly across the line.

The various novel features of my invention will be apparent from the description and drawing, and will be particularly pointed out in the claims.

Figure 1 shows part of a power-operated shovel, with an electric motor for furnishing the thrust; Fig. 2 is a diagram of a control system for such motor, and illustrates one embodiment of my invention; and Fig. 3 shows a modified form of the solenoid-operated jerking switch.

The dipper 10 of the power-operated shovel is mounted at the end of the thrust bar 11, and may be raised or lowered by the hoisting chain or cable 12 passing through a block 13 connected to the dipper and over pulleys 14, 15, and 16 on the crane 17 of the shovel. The crane is mounted so that it and the parts carried thereby may be rotated around a vertical axis. The shovel itself is of the usual well known construction. Electric motors are provided for sluing the crane, for operating the hoisting cable 12, and for operating the thrust bar 11. The present invention is concerned only with the motor 18 for operating the thrust bar 11, and the controlling apparatus therefor. The other motors may be controlled in any desired manner, and indeed may be other than electric motors, if desired. The operation of the thrust motor 18 is peculiar in that during much of its operation it serves merely to hold the dipper 10 against the bank which is being excavated and does not rotate.

The thrust motor control system illustrated in Fig. 2 is for the most part of a well known type. The master controller 19 may be separate from or combined with the master reversing switch 20. For the sake of simplicity it is illustrated as being separate. The master reversing switch 20 being set for the desired direction of rotation of the motor 18, which is preferably a series motor, the master controller 19 is moved from off position to the first or other on postion. This movement first energizes the coils 21 and 22. The coil 21 is a mere holding coil and does not lift its core. The coil 22 closes the main switch or circuit-breaker 23, thus completing the cicuit, provided all of the resistance switches 24, 25, 26, and 27 are in their lower positions, for the proper operating coil 28 or 29 of the main reversing switch 30. The coil 28, say, being thus energized, the reversing switch 30 is closed to one side, thus completing the circuit of the motor 18 through the circuit-breaker 23, the four resistance sections 31, 32, 33, and 34 of the variable resistance, and the permanent resistance 35. The actuating coils for the reversing switch 30 cannot be energized unless all of the switches 24, 25, 26, and 27 are in their lower positions, for the energizing circuit of such coils is completed through the auxiliary switches 24ª, 25ª, 26ª, and 27ª in their lower positions. The main reversing switch 30 is provided with an auxiliary switch 36, which, upon the closing of the switch 30 to either position, completes the circuit for the actuating coil of the reversing switch independently of the auxiliary switches 24ª, 25ª, 26ª, and 27ª.

The master controller 19 being in position 2 or beyond, the operating coil 37 of the first resistance switch 24 is now energized through such master controller, an auxiliary switch 38, a jamming relay switch 39, and the auxiliary switch 36, unless the series opening coil 40 of the auxiliary switch 38 is energized sufficiently strongly to open the switch 38. In the latter case, the coil 37 will not be energized until the current taken by the motor has dropped sufficiently to allow the switch 38 to close. Upon the energization of the coil 37, the first resistance switch 24 is closed to cut out the first section 31 of the variable resistance. If the master controller is now in position 3 or beyond, the actuating coil 42 of the second resistance switch 25 is energized through the auxiliary switch 24ª in its upper position and an auxiliary switch 43 to cut out the second section 32 of the variable resistance, unless such auxiliary switch 43 is held open by its opening coil 44 which is now in series with the motor 18. In the latter case, the coil 42 is not energized until the motor current has dropped sufficiently to allow the switch 43 to close. Similarly, the actuating coils 45 and 46 for the fourth and fifth resistance switches 26 and 27 are energized if the master controller has been moved at least as far forward as the fourth or fifth positions respectively, provided all the previous resistance switches have been lifted and the current supplied to the motor 18 does not exceed the predetermined value for which the coils 47 or 48 are set. After all four sections of the variable resistances have been cut out, the permanent resistance 35 is still in circuit with the motor. Thus in case the dipper should jam and the motor 18 should not be able to force the thrust bar 11 forward, the resistance 35 prevents any disastrous results which might occur from having the motor 18 connected directly across the line. However, in case such jamming occurs, the current taken by the motor, which is stopped by the jamming, may rise above its normal value, and in such case, whether all or less than all the variable resistance has been cut out, the actuating coil 49 of the jamming relay 39 is actuated to open such relay and break the circuit of the coil 37; thus causing the switch 24, and then the other resistance switches, which all depend upon having the switch 24 in its closed position, to open and cut in all the variable resistance. The actuating coil 49 of the jamming relay is so connected that it is always in circuit with the motor. The jamming relay switch may be arranged in the circuit of the actuating coil of any desired one of the resistance switches, so that its opening may cause the cutting in of all or less than all the variable resistances. Although the jamming relay and the permanent resistance 35 probably furnish sufficient protection for all ordinary purposes, yet to care for extraordinary occurrences, such as short-circuits, there is provided an overload coil 50. This coil, when energized sufficiently strongly, lifts its core 51 and thereby opens the auxiliary switch 52 to cause the deënergization of the coil 22 and the consequent opening of the circuit-breaker 23. This interrupts all circuits save that of coil 21, and the coil 21 holds the switch 52 open to maintain the circuit of the coil 22 broken until the master controller 19 has been moved back to off position. The coil 50 requires a stronger current in order to operate its core than does the actuating relay coil 49 to open the switch 39, and the latter coil requires a stronger current for its operation than do the coils 40, 44, 47, and 48 for theirs. The coils 46, 45, 42, 37, and 22 and 21 may be deënergized successively by moving the controller backward from position 5 to off position, and thus the variable resistance may be cut into circuit with the motor 18, and the circuit finally broken.

The control system thus far described is an automatically accelerated system which prevents the current supplied to the motor from rising beyond a predetermined value, the extent to which the acceleration proceeds being determined by the position to which the master controller 19 is moved. It is impossible in this system, unmodified, to obtain any but a gradual acceleration of the motor 18. It is therefore impossible to shake the dipper 10. A shaking movement would also be impossible with any other control system hitherto known, so far as I am aware. In order to obtain this shaking movement an auxiliary solenoid switch 53 is provided. This switch is normally open, but when closed short-circuits part of the variable resistance, say the sections 31, 32, and 33. The proportionate part which is thus short-circuited may be variable, if desired. The solenoid 54 of this switch 53 is controlled by a switch 55, which is normally open but which may be closed through suitable mechanism by a push button 56 in the handle 57 of the master controller 19. By depressing the push button 56 while the master controller is in either the first, second or third position, the switch 53 is caused to close, thus short-circuiting any of the resistance sections 31, 32, and 33 which may be in circuit and giving a jerk to the motor 18. This jerk may be repeated as often as desired by repeatedly depressing the push button 56, and thus a shaking movement may be given to the dipper 10. Or, with the push button 56 held depressed the master controller 19 may be moved repeatedly between the off position and the first position, the master controller when in first position under these conditions causing the same effect as that ultimately produced under normal conditions by the master controller in the fourth position. This also gives the dipper 10 a shaking motion.

In some instances it may be desirable to prevent the possibility of holding the jerking switch closed indefinitely. In such cases, the jerking switch may be built as indicated in Fig. 3. The switch 53$^a$ is operated by the solenoid 54, exactly as is the switch 53 in the arrangement of Fig. 2. But the switch 53$^a$ can only close its circuit momentarily, or while it is on the button 58. If the solenoid 54 is maintained energized longer than is necessary to obtain the desired jerk, the switch 53$^a$ passes on to the button 59 and breaks the circuit. A suitable dash-pot 60 may be provided to prevent the time the switch 53$^a$ is closed from being too short.

While I have described my invention as applied to a particular form of remotely controlled automatically accelerated control system it is not limited to such application. It may be applied with advantage to any type of control system, whether remotely or directly controlled and whether or not automatically accelerated. Many modifications may also be made in the details of the arrangement for causing the master controller when in this less advanced position to produce an effect the equivalent of that which it would normally produce when in a more advanced position. All modifications which come within the broad scope of my invention I aim to cover in the following claims.

What I claim as new is:

1. In combination, an electric motor, and unitary control means adapted to effect a gradual acceleration of said motor from off position or for causing when in a position to produce a comparatively low motor speed the same effect it normally produces when in a more advanced position.

2. In combination, an electric motor, and unitary control means for causing a gradual change in the speed of said motor from off position or for producing when in a less advanced "on" position for a predetermined time the same effect it normally produces when in a more advanced position.

3. In combination, an electric motor, a plurality of resistances in the circuit of said motor, unitary control means for cutting out said resistance step by step or for causing when in a position to include a certain amount of resistance the cutting out of an amount of such resistance which it would normally cause to be cut out only when in a more advanced position.

4. In combination, an electric motor, a variable resistance, unitary control means for causing said resistance to be cut out step by step or for causing while in a plurality of resistance including positions the cutting out of an amount of such resistance which normally it cannot cut out until it reaches a more advanced position.

5. In combination, an electric motor, an automatically accelerated control system therefor, and means for suddenly producing at will an advanced control effect independently of the automatic acceleration, said system automatically returning on discontinuance of operation of said means to its condition prior to the operation of said means.

6. In combination, an electric motor, an automatically accelerated control system therefor, and means for momentarily producing at will an advanced control effect independently of the automatic acceleration, said system automatically returning on discontinuance of operation of said means to its condition prior to the operation of said means.

7. In combination, an electric motor, a variable resistance therefor, an automatically accelerated control system for cutting out said resistance step by step, and means controlled at will for causing the cutting out of a predetermined amount of such resistance independently of the automatic acceleration.

8. In combination, an electric motor, and a remotely controlled automatically accelerated control system therefor, said system including a master controller having a single handle for controlling a gradual change in speed of said motor and having an operative member adapted when the handle is in a less advanced position to produce an effect equivalent to that normally produced by it in a more advanced position.

9. In combination, an electric motor, a variable resistance in the circuit of said motor, and unitary means for controlling the motor circuit, cutting out said resistance step by step, and for cutting out a predetermined amount of such resistance which is greater than one step only after the motor circuit has been completed through said variable resistance.

10. In combination, an electric motor, a variable resistance in the circuit thereof, a switch for interconnecting two points of said resistance, and a controller having a single handle for controlling the motor circuit, varying said resistance, and also controlling the actuation of said switch.

11. In combination, an electric motor, a variable resistance in the circuit thereof, a controller for varying said resistance, a switch for interconnecting two points on said resistance, and means which allows but the momentary closure of said switch.

12. In combination, an electric motor, a variable resistance in the circuit thereof, a controller for varying said resistance, a normally open switch which when closed connects two points on such resistance, and means associated with the operating means for said controller for controlling said switch.

13. In combination, an electric motor, a variable resistance in circuit therewith, unitary means for controlling the motor circuit and varying said resistance, a normally open switch which when closed connects two points of such resistance, and a solenoid for closing said switch, said unitary means also being adapted to control the energization of said solenoid.

14. In combination, an electric motor, a variable resistance in the circuit thereof, means for varying said resistance, a normally open switch which when closed connects two points on such resistance, a solenoid for closing said switch, means for controlling said solenoid, and means which allows but the momentary closure of said switch.

15. In combination, a power-operated shovel, including an electric motor for furnishing part of the power, and means for causing said motor to give the dipper of said shovel a shaking motion.

16. In combination, a power-operated shovel, including an electric motor for furnishing the thrust, and means for controlling said motor so that it will give the dipper of the shovel a shaking motion.

17. In combination, an electric motor, a variable resistance in the circuit of said motor, and unitary control means adapted to effect a gradual acceleration of said motor by the gradual cutting out of said resistance or to suddenly produce an advanced control effect only when a portion of said resistance is in circuit.

Milwaukee, Wis., April 5, 1910.

In testimony whereof I affix my signature, in the presence of two witnesses.

RAY C. NEWHOUSE.

Witnesses:
 WILLIAM WRAY,
 C. J. RATTERMANN.